(12) United States Patent
Chen

(10) Patent No.: US 10,157,162 B2
(45) Date of Patent: Dec. 18, 2018

(54) EXTERNAL UNIVERSAL BOOSTING AGENT DEVICE THAT IMPROVES COMPUTING PERFORMANCE BY MANAGING THE OFFLOADING OF APPLICATION TASKS FOR CONNECTED ELECTRONIC DEVICES

(71) Applicant: INTEL CORPORATION, Santa Clara, CA (US)

(72) Inventor: Kenji Chen, Chupei (TW)

(73) Assignee: Intel Corporation, Santa Clara, CA (US)

( * ) Notice: Subject to any disclaimer, the term of this patent is extended or adjusted under 35 U.S.C. 154(b) by 172 days.

(21) Appl. No.: 15/194,386

(22) Filed: Jun. 27, 2016

(65) Prior Publication Data

US 2017/0371829 A1    Dec. 28, 2017

(51) Int. Cl.
*G06F 13/00*    (2006.01)
*G06F 13/42*    (2006.01)
*G06F 13/40*    (2006.01)

(52) U.S. Cl.
CPC ...... *G06F 13/4282* (2013.01); *G06F 13/4068* (2013.01)

(58) Field of Classification Search
CPC .......................... G06F 13/4282; G06F 13/4068
See application file for complete search history.

(56) References Cited

U.S. PATENT DOCUMENTS

| 5,937,169 A * | 8/1999 | Connery ............... G06F 13/387 709/250 |
| 8,341,262 B2 * | 12/2012 | Pirzada ............. H04L 12/40006 709/224 |
| 9,535,770 B2 * | 1/2017 | Ahnn ........................ G06F 9/54 |
| 2002/0091844 A1 * | 7/2002 | Craft ........................ G06F 5/10 709/230 |
| 2003/0158906 A1 * | 8/2003 | Hayes ................... G06F 9/5027 709/211 |
| 2005/0246563 A1 | 11/2005 | Chandley et al. |
| 2011/0314354 A1 | 12/2011 | Fillingim |
| 2013/0282925 A1 | 10/2013 | Cawse et al. |

FOREIGN PATENT DOCUMENTS

EP     2 781 989 A1     9/2014

OTHER PUBLICATIONS

International Search Report and Written Opinion on application No. PCT/US2017/034242, dated Aug. 30, 2017.

* cited by examiner

*Primary Examiner* — Tammara R Peyton
(74) *Attorney, Agent, or Firm* — Lowenstein Sandler LLP

(57) ABSTRACT

An example system on a chip (SoC) includes a processor, a cache, and a main memory. The processor can receive a data packet from an electronic device via an interface device, the data packet comprising data for an offload processing task, where the data packet is in a standard link protocol format, the standard link protocol format comprising at least one of an offload protocol identification (ID) field, a tag field, a returned data length field, a flag field, a reserved field, a length field, or a data field. The processor can process the offload processing task to obtain result data. The processor can send the result data to the electronic device.

20 Claims, 13 Drawing Sheets

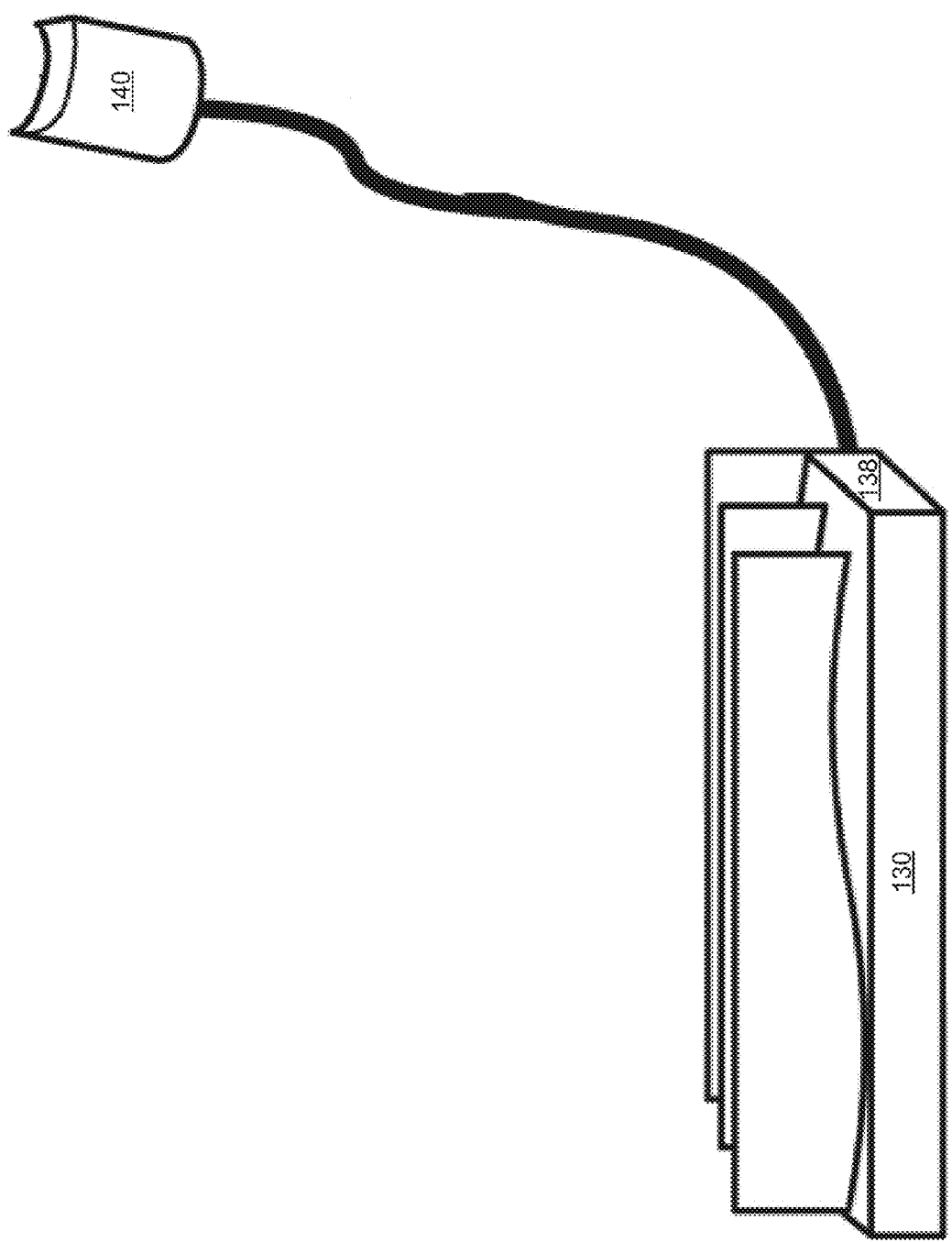

EXTERNAL UNIVERSAL BOOSTING AGENT DEVICE THAT IMPROVES COMPUTING PERFORMANCE BY MANAGING THE OFFLOADING OF APPLICATION TASKS FOR CONNECTED ELECTRONIC DEVICES

BACKGROUND

A personal computer, a laptop computer, a notebook, a netbook, a mobile device, or other electronic device may be limited in its processing capability by an on-board processor that is integrated into the electronic device. In order to boost a processing capability of the electronic device, the electronic device may include a communication interface to accommodate an external processing device. The external processing device can offload at least part of the workload of the on-board processor in the electronic device.

BRIEF DESCRIPTION OF THE DRAWINGS

Various embodiments of the present invention will be understood more fully from the detailed description given below and from the accompanying drawings of various embodiments of the invention.

FIG. 1B illustrates the boosting agent device 130 with a connector 140 according to one embodiment.

DESCRIPTION OF EMBODIMENTS

Figure 1A:
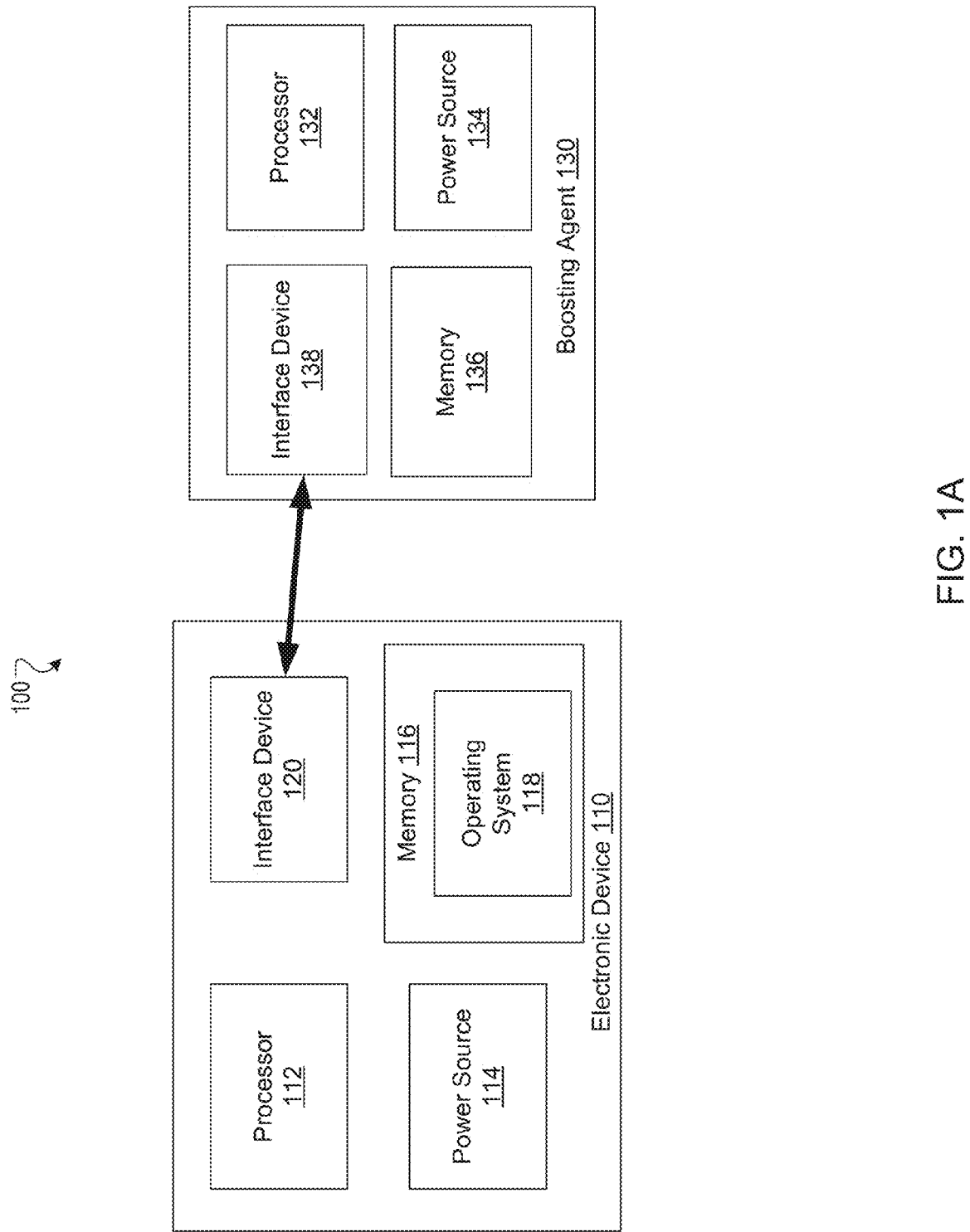
FIG. 1A shows a system 100 with an electronic device 110 and a boosting agent device 130 according to one embodiment.

The embodiments described herein are directed to technology of a universally compatible boosting agent device to boost a computing performance of an electronic device, such as personal or portable electronic devices. Typically, users tend to carry a single electronic device with them, such as a smartphone or a tablet, to use for entertainment, communications, gaming, video streaming, photography, or productivity functions. While the electronic device can offer convenience and portability, the electronic device lacks computing power to perform tasks requiring heavy processing power. The tasks requiring the heavy processing power can include heavy gaming tasks, high definition video streaming tasks, or heavy productivity tasks. The electronic device can lack performance scalability, a proper thermal solution, and battery capacity to support the heavy processing power. Conventionally, to increase the performance scalability and battery capacity desired by users, peripheral devices can be coupled to the electronic device for decrease a thermal dispassion from the electronic device.

The peripheral devices can include printing devices, storage devices, displays, battery packs, and so forth. The peripheral devices can be communicatively coupled to the electronic device. The peripheral devices can execute instructions sent to them by the electronic device that do not contribute to the primary functions of the electronic device, such as performing computations. The peripheral devices provide input/output (I/O) functions to the electronic device and serve as auxiliary devices without computationally-intensive functionality.

Conventionally, the peripheral devices do not have main processors, such as central-processing units (CPUs), to perform computationally-intensive functionality. The electronic device may perform the processing for the peripheral device. For example, when the peripheral device is a keyboard, the electronic device may convert signals received from the keyboard into a data format understandable by the electronic device. The keyboard does not perform the data conversion in order to perform the primary function of providing user input to the electronic device. While the peripheral devices can be auxiliary devices that have auxiliary microprocessors to perform rudimentary tasks, the peripheral devices do not support computationally-intensive functionality. The peripheral devices are also limited in their capability to increase a computational functionality and bandwidth of the electronic device.

Additionally, for the electronic device to make use of the functionality of the peripheral devices, the electronic device requires a software driver that is specific to a peripheral device or is specific to a class of peripheral devices that share a common generic interface. For example, when an electronic mouse is connected the electronic device via a USB port, the electronic device uses a software driver to communicate and understand the data exchanged between the electronic mouse and the electronic device to control movement of a pointer across a display of the electronic device. In this example, the driver converts the data received from the electronic mouse and the driver sends the converted data to a program, such as an operating system, that controls the movements of the pointer based on the converted data.

To obtain the software driver when the peripheral device is connected to the electronic device, an operating system (OS) executing on the electronic device determines an identity (ID) of the peripheral device. When the OS determines an ID of the peripheral device, the OS can then determine whether the driver is stored in a memory of the electronic device. When the memory does not store the driver, the OS may request that a user install a driver from the peripheral device. For example, in order to install the driver, the OS can request that a user insert a removable storage device, such as a universal serial bus (USB) memory drive, or download a file from the Internet that includes the driver. The drivers are also OS-specific drivers. For example, a driver that connects a printer to an electronic device using an OS developed by a first software company, is different than a driver that connects the same printer to the electronic device using an OS developed by a second software company. Finding and installing drivers across different devices and for different OSs can be difficult to manage.

The embodiments described herein may address the above noted deficiencies by providing a universally compatible boosting agent device to boost a computing performance of an electronic device. The architecture of the boosting agent device can include high-speed, high-bandwidth interface devices (e.g., buses or other interfaces) to increase a bandwidth of the boosting agent device. To universally connect with electronic devices, the boosting agent device can include utilize a protocol layer for communications between the boosting agent device and the respective electronic device. One advantage of the boosting agent device is to offload processes, tasks, operations of one or more programs or services running on the electronic device and programs from the electronic device to increase a performance and battery life of the electronic device. Another advantage of the boosting agent device, as described herein, is that it can be universally connected with electronic devices having various hardware and software configurations and running various OS s.

FIG. 1A shows a system 100 with an electronic device 110 and a boosting agent device 130 according to one embodiment. The electronic device 110 may be a desktop computer, a laptop computer, a handheld computer, wearable computer, a tablet computer, a personal digital assistance (PDA), a smartphone, an electronic tablet, and so forth. The electronic device 110 can include an interface device 120. The electronic device 110 can be communicatively coupled with the boosting agent device 130 via the interface device 120 to send and receive data in order to offload processing tasks from the electronic device 110 to the boosting agent device 130. In one embodiment, the interface device 120 can be part of a system on a chip (SoC). In another embodiment, the interface device 120 can be an integrated circuit that is couple to a processor 112.

In one embodiment, the interface device 120 can be one or more integrated circuits. In one embodiment, the interface device 120 can include a radio frequency (RF) chip or a network card. In one embodiment, the interface device 120 can include a cable to connect the electronic device 110 to a port that is part of an interface device 138 of the boosting agent device 130. In another embodiment, the interface device 120 can include a port to receive a cable of an interface device 138 to connect the electronic device 110 to the boosting agent device 130. The interface device 138 can be integrated into the boosting agent 130 and the same or similar to the interface device 120 as described herein.

In another embodiment, the interface devices 120 and 138 can include wireless communication modules to communicate data between the electronic device 110 and the boosting agent device 130. In one embodiment, the interface device 120 may communicate the information using a cellular network and/or a wireless network. In one example, the communication network may be a cellular network employing a third generation partnership project (3GPP) release 8, 9, 10, 11, or 12 or Institute of Electronics and Electrical Engineers, Inc. (IEEE®) 802.16p, 802.16n, 802.16m-2011, 802.16h-2010, 802.16j-2009, 802.16-2009. In another embodiment, the communication network may be a wireless network (such as a network using Wi-Fi® technology developed by the Wi-Fi Alliance) that may follow an IEEE® standard developed by the Institute of Electrical and Electronics Engineers, Inc., such as the IEEE 802.11-2012, IEEE 802.11ac, or IEEE 802.11ad standards. In another embodiment, the communication network may deploy Bluetooth® connections developed by the Bluetooth Special Interest Group (SIG) such as Bluetooth v1.0, Bluetooth v2.0, Bluetooth v3.0, or Bluetooth v4.0. In another embodiment, the communication network may be a Zigbee® connection developed by the ZigBee Alliance such as IEEE 802.15.4-2003 (Zigbee 2003), IEEE 802.15.4-2006 (Zigbee 2006), IEEE 802.15.4-2007 (Zigbee Pro). In another embodiment, the interface device 120 may communicate the data or offload processing tasks using a wired communication network, such as communicating using an Ethernet connection, coaxial connection, a USB connection, a Thunderbolt® connection, a peripheral component interface device express (PCIe) connection, and so forth.

The electronic device 110 can include a processor 112 and a memory 116. In one embodiment, the processor 112 can be a single core processor. In another embodiment, the processor 112 can be a multi-core processor. In one embodiment, the memory 116 may be volatile memory, and thus temporarily store data and commands. In another embodiment, the memory 116 may be non-volatile storage, such as a hard disk drive. The memory can store instructions for an operating system 118 that can be executed by the processor 112. The memory 116 can also store other data or instructions.

In one embodiment, the boosting agent device 130 can be a processing device that is external to the electronic device 110. In one example, the electronic device 110 can have a housing with a cavity that can house the processor 112, the power source 114, the memory 116, and the interface device 120. The electronic device 110 can be a portable electronic device, such as a smartphone, an electronic tablet, a laptop computer, and so forth. The electronic device 110 can also include a display (such as a touch screen), an antenna, a charging port, a speaker, an audio port, and so forth. In another example, the boosting agent device 130 can have a housing with a cavity that can house the processor 132, the power source 134, the memory 136, and the interface device 138. The boosting agent device 130 can be a portable device that can be coupled to the electronic device 110 to boost a processing power or functionality of the electronic device 110. For example, the electronic device 110 can be a smartphone and the boosting agent device 130 can be coupled to the smartphone to increase a functionality and processing power of the smartphone.

The electronic device 110 can offload instructions and offload processing tasks to the boosting agent device 130 for the boosting agent device 130 to execute and complete. In one example, the boosting agent device 130 can include: a processor 132, such as a CPU, a processing core, or a processing core integrating or coping with graphics processing unit (GPU); a power source 134, such as a battery or power circuits; a memory 136, such as a random access memory (RAM), cache memory, or a main memory; and an interface device 138.

The boosting agent device 130 can be coupled to the electronic device 110 via the interfaces 120 and 138. When the boosting agent device 130 is coupled to the electronic device 110, the electronic device 110 can overload at least a part of the workload of the processor 112 to the processor 132 of the boosting agent device 130. In one embodiment, the boosting agent device 130 can increase a performance and decrease a power consumption level of the electronic device 110 by offloading a workload of the electronic device. In another embodiment, the boosting agent device 130 can also provide the electronic devices with additional functionality. For example, the processor 132 can be a processing core integrating or coping with graphical processing unit (GPU) that can offload graphical tasks from the processor 112. The GPU can process the graphical tasks and return the results of the graphical task to the processor 112.

In one example, the offload processing tasks of the electronic device 110 may be distributed between its processor 112 and the processor 132. In another example, the processor 112 can be assigned a first offload processing task and the processor 132 can be assigned a second offload processing task. The processor 112 can perform the first offload processing task in parallel with the processor 132 performing the second offload processing task.

FIG. 1B illustrates the boosting agent device 130 with a connector 140 according to one embodiment. Some of the features in FIG. 1B are the same or similar to the some of the features in FIG. 1A as noted by same reference numbers, unless expressly described otherwise.

In one embodiment, the connector 140 can be part of the interface device 138. The boosting agent device 130 can use the interface device 138 and the connector 140 to send and receive data with the electronic device 110. For example, the connector 140 can be a USB connector (such as a type C connector), a Thunderbolt® interface connector, a peripheral component interface express (PCIe) interface connector, and so forth.

The interface device 138 can operate according to a standard that has been adopted by the electronics industry for establishing a communication protocol between an electronic device 110 and the boosting agent device 130 using the connector 140. The communication protocol is a system of rules that allow two or more entities in the system 100 to transmit information. The rules or standard defines a syntax, semantics, and synchronization of the communication between the entities. In one embodiment, when the connector 140 is a USB connector, the boosting agent device 130 can use a USB standard to establish a communication protocol with the electronic device 110. For example, the USB standard can provide that the boosting agent device 130 communicates at a maximum rate of 10 gigabit per second and can transfer a limited amount of power (such as 100 W maximum) to the electronic device 110. The USB standard can also specify how the boosting agent device 130 identifies itself to the electronic device 110. For example, when the connector 140 is attached to the electronic device 110, a startup protocol is defined in which the electronic device receives information about the boosting agent device 130. The information about the boosting agent device 130 can include communications protocols.

Figure 1C:
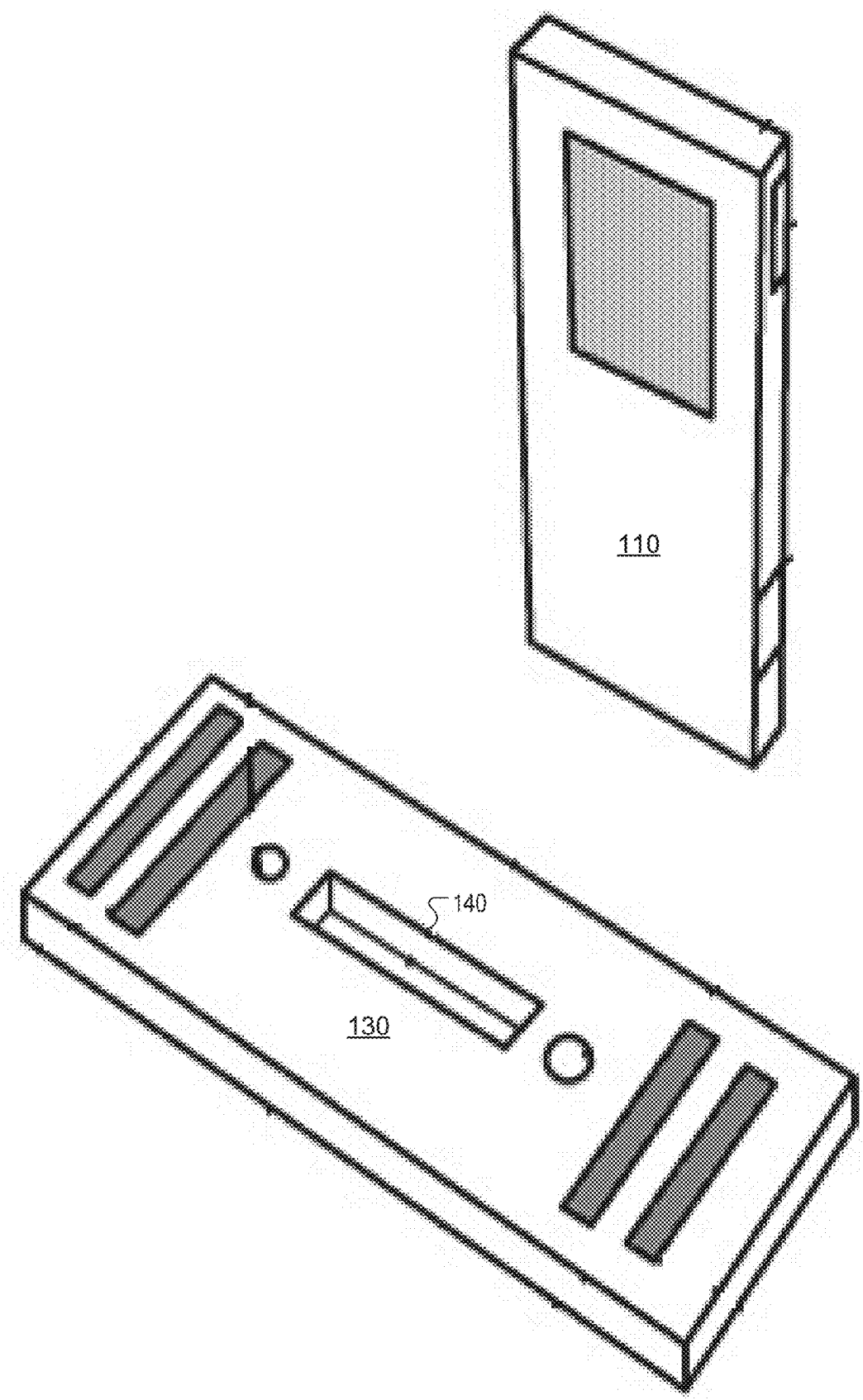
FIG. 1C shows the boosting agent device 130 with a connector 140 to connect the boosting agent device 130 with the electronic device 110 according to one embodiment.

FIG. 1C shows the boosting agent device 130 with a connector 140 to connect the boosting agent device 130 with the electronic device 110 according to one embodiment. Some of the features in FIG. 1C are the same or similar to the some of the features in FIGS. 1A and 1B as noted by same reference numbers, unless expressly described otherwise.

In one embodiment, the connector 140 can be a docking port that is shaped to receive the electronic device 110. The docking port can form a coupling between the electronic device 110 and the docking port 140. In another embodiment, the connector 140 can enable the electronic device 110 to transfer data and offload processing tasks to the boosting agent device 130. In another embodiment, the power source 134 of the boosting agent device 130 can transfer power to the electronic device 110. In another embodiment, the connector 140 can simultaneously transfer data, commands, and/or power between the boosting agent device 130 and the electronic device 110. For example, the electronic device 110 can be placed into the docking port where it can offload processing tasks to the boosting agent device as well as receive power from the power source 134 to recharge the power source 114.

In one embodiment, the connector 140 can be a USB connector, such as a USB type-C connector. The boosting agent device 130 can simultaneously charge and boost the performance the electronic device 110 when connected to it via the USB connector.

Figure 2:
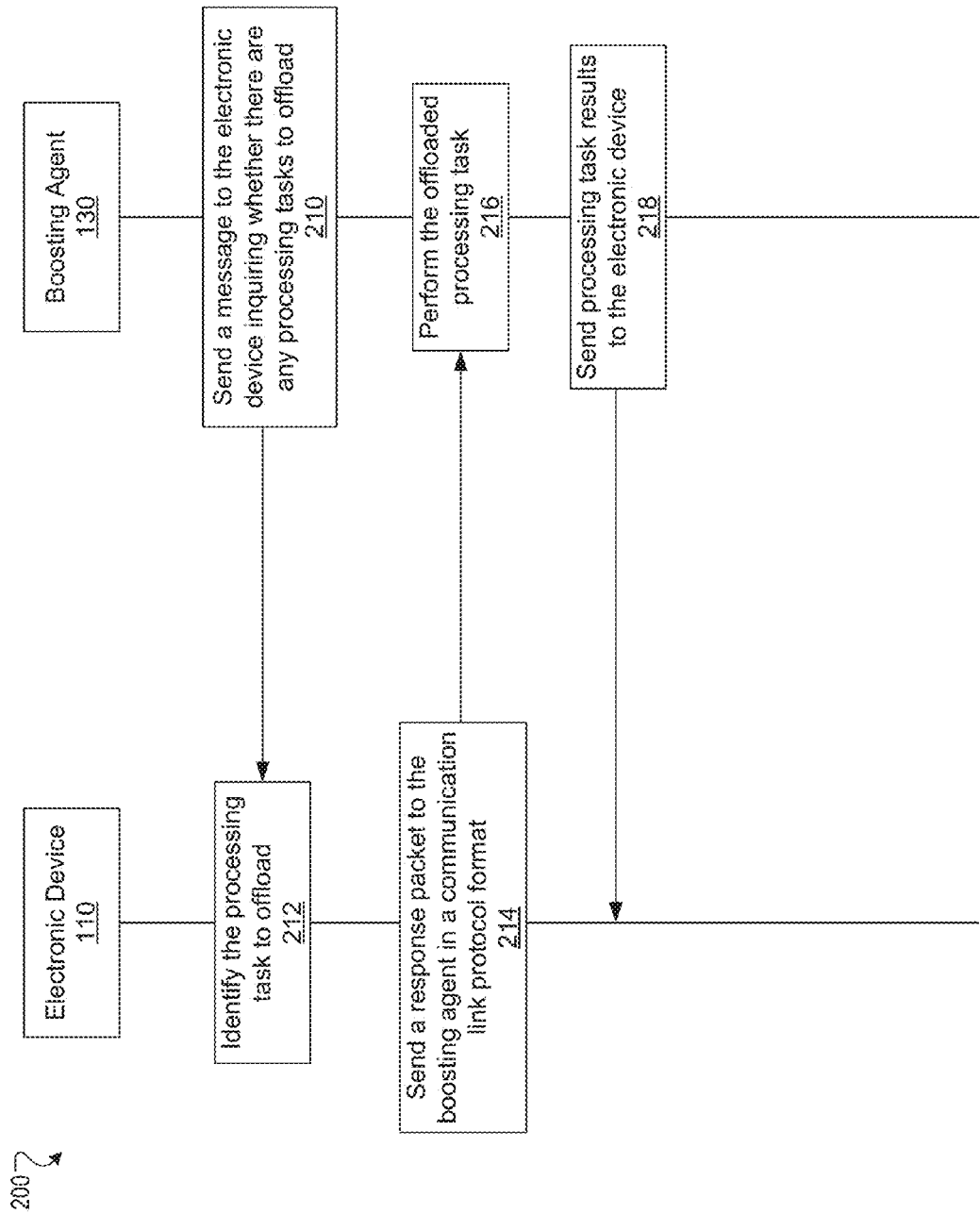
FIG. 2 illustrates a flowchart of a method for offloading an offload processing task from the electronic device to the boosting agent device according to one embodiment.

FIG. 2 illustrates a flowchart of a method 200 for offloading an offload processing task from the electronic device 110 to the boosting agent device 130 according to one embodiment. The method 200 may at least partially be performed by processing logic that includes hardware (e.g., circuitry, dedicated logic, programmable logic, microcode, etc.), software (e.g., instructions executed by a processing device), firmware, or a combination thereof. The method 200 may be performed by all or part of the system 100 of FIG. 1. For example, the method 200 may be performed by all or part of the processing logic the electronic device 110 or the processing logic of the boosting agent device 130. Some of the features in FIG. 2 are the same or similar to the some of the features in FIG. 1A-1C as noted by same reference numbers, unless expressly described otherwise.

Referring to FIG. 2, the method 200 begins with the boosting agent device 130 sending a message to the electronic device 110 inquiring whether there are any offload processing tasks to offload to the boosting agent device 130 (210). The message can include capability information of the boosting agent device 130. For example, the capability information can indicate that the boosting agent device 130 has a given processing capacity or memory capacity.

In the method 200, the processing logic of electronic device 110 can identify an offload processing task to offload to the boosting agent device 130 (212). In one embodiment, the processing logic of electronic device 110 identify the offload processing task to offload to the boosting agent device 130 in response to receiving the message from the boosting agent device 130.

In another embodiment, the processing logic of the electronic device 110 can identify the offload processing tasks when the boosting agent device 130 is connected to the electronic device 110. In another embodiment, the processing logic of the electronic device 110 can determine whether an offload processing task can be offloaded to the boosting agent device 130 when the processing logic receives an offload processing task from an application or other component of the electronic device 110. For example, when the processing logic receives an offload processing task from the application, the processing logic can determine whether the processing capabilities of the boosting agent device 130 can perform the offload processing task. When the processing capabilities of the boosting agent device 130 enables the boosting agent device 130 to perform the offload processing task, the processing logic can send the offload processing task to the boosting agent device 130.

In one example, to identify an offload processing task to offload, the electronic device 110 can match the processing requirements of the offload processing task with the capability information of the boosting agent device 130. When the processing requirements do not exceed the processing capabilities of the boosting agent device 130, then the electronic device 110 can offload the offload processing task to the boosting agent device 130. In another embodiment, the processing logic of the electronic device 110 can compare different processing tasks to the capability information and identify the offload processing task in response to finding a task matching the capabilities of the boosting agent device 130. When the processing requirements do exceed the processing capabilities of the boosting agent device 130, the electronic device 110 can search for another offload processing task to offload.

The method can include the electronic device 110 sending a response data packet to the boosting agent device 130 via a communication channel. A format of the response data packet can follow a standard link protocol, as discussed in greater detail below (214). The response data packet can include data and/or instructions of an offload processing task for the boosting agent device 130 to perform. In one example, boosting agent 130 can format the result data to be in a standard link protocol format.

In one embodiment, to offload processing tasks, the electronic device 110 may send data and commands to the boosting agent device 130 using a predefined protocol employed by the boosting agent device 130. When the boosting agent device 130 has executed the commands using the data, the boosting agent device 130 can send the resulting data back to the electronic device 110 using the same protocol. The method can include the boosting agent device 130 performing the offload processing task (216). The method can include sending the offload processing task results to the electronic device 110 via the communication channel (218). The offload processing task results can follow the standard link protocol.

Figure 3A:
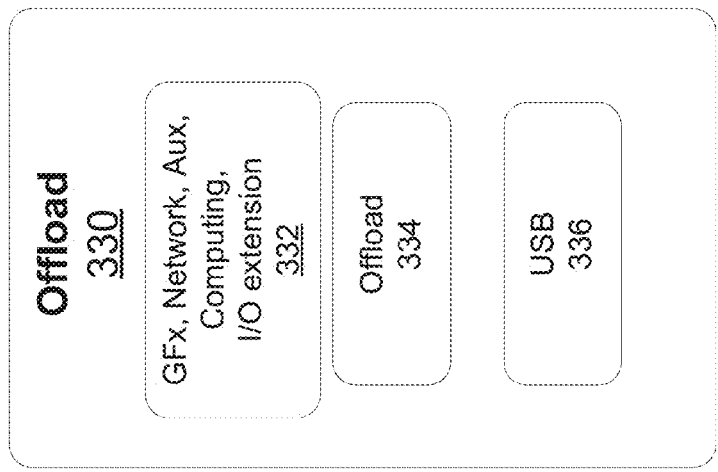
FIG. 3A illustrates standard link protocols for transferring data between an electronic device and an external boosting agent device according to one embodiment.
Figure 3A:
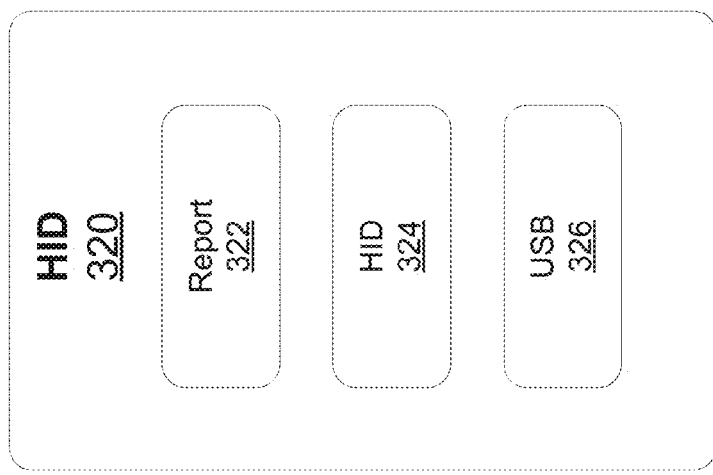
Figure 3A:
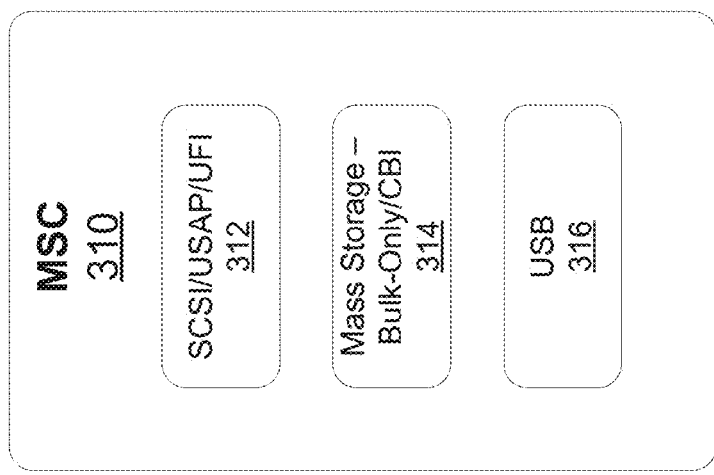

FIG. 3A illustrates standard link protocols 310, 320, and 330 for transferring data between an electronic device and an external boosting agent device according to one embodiment. In one embodiment, the electronic device 110 or the boosting agent device 130 can use the standard link protocols 310, 320, and 330 to transfer data for the offload processing task.

In one embodiment, USB specifications can define MSC standard link protocols as standards for connecting removable memory devices or drives to electronic devices. For example, the MSC standard link protocols are a set of protocols for managing communications between USB storage devices and operating system of an electronic device to store and retrieve data. The MSC standard link protocols can be used for a USB flash drive, an external hard drive, a card reader, and so forth. The electronic device can communicate with a USB mass storage class (MSC) device using an MSC standard link protocol.

In another embodiment, the electronic device can communicate with a USB human interface device (HID) using a HID standard link protocol. USB specifications can define HID standard link protocols as standards for connecting HIDs to the electronic device. For example, HID standard link protocols are a set of protocols for managing communications between the HIDs and an operating system of the electronic device. The electronic device can receive input data from user devices such as a keyboard, mouse, or a track pad.

In another embodiment, the electronic device can communicate with a USB boosting agent device using offload standard link protocols 330. The offload standard link protocols 330 can define protocols for connecting a boosting agent device to an electronic device. For example, the offload standard link protocols 330 are a set of protocols for managing the offloading of offload processing tasks from the electronic device to the boosting agent device. The offload processing tasks can include computational tasks, graphical processing tasks, network processing tasks, audio processing tasks, I/O extension tasks, and so forth. An advantage of the electronic device and the boosting agent device using the offload standard link protocols 330 is that the electronic device and the boosting agent device do not need any other drivers to communicate the offload processing tasks. For example, when the electronic device and the boosting agent device are compliant with the offload standard link protocols 330, the electronic device and the boosting agent device can communicate the offload processing tasks using the offload standard link protocols 330. In this example, no other drivers need to be installed for the electronic device and the boosting agent device to communicate because each device follows the offload standard link protocols 330 to communicate the offload processing task information.

The standard link protocols 310, 320, and 330 can each include multiple protocol layers 340-344 used to communicate data between the electronic device and the external devices, as discussed above. The protocol layers can include a top sub-layer protocol 340, a middle sub-layer protocol 342, and a bottom sub-layer protocol 344. In one embodiment, the top sub-layer protocol 340 can be a software application for the electronic device communicating with a USB device. In another embodiment, the top sub-layer protocol 340 can be software to control the USB device. The middle sub-layer protocol 342 can be a software layer to format data or offload processing task information received from the electronic device or the USB device. In one embodiment, the bottom sub-layer protocol 344 represents a protocol for communicating the data or offload processing task information over a communication channel between the electronic device and the USB device. The bottom sub-layer protocol can include protocols for a transmit path and a receive path between the electronic device and the USB device.

Figure 3B:
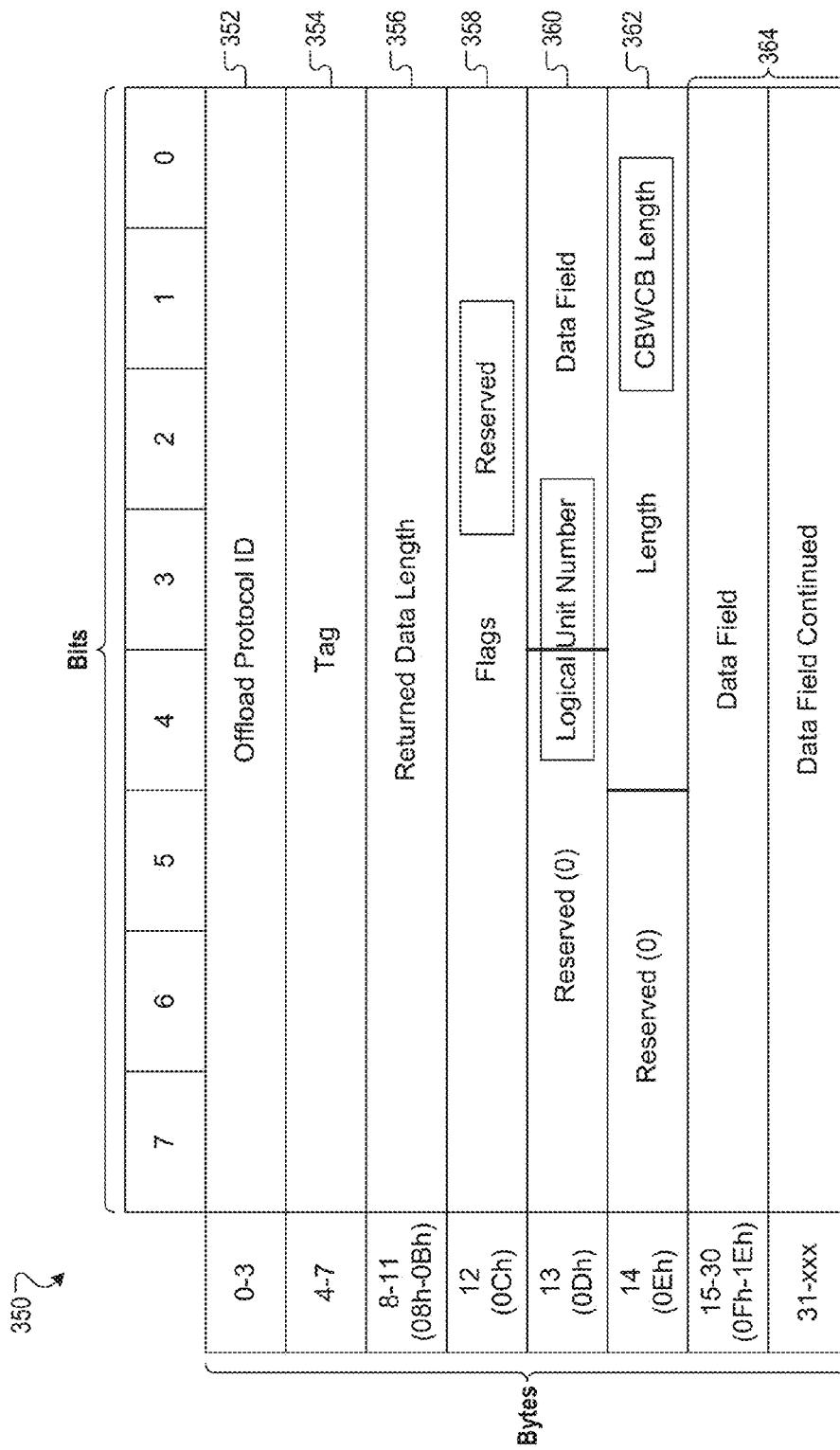
FIG. 3B illustrates a format of offload processing task information according to a middle sub-layer protocol for the offload protocol in FIG. 3A, according to one embodiment.

FIG. 3B illustrates a format 350 of offload processing task information according to a middle sub-layer protocol 342 for the offload protocol 330 in FIG. 3A, according to one embodiment. The format 350 can include an offload protocol identification (ID) field 352, a tag field 354, a returned data length field 356, a flag field 358, a reserved data field 360, a length field 362, and a data field 364

The offload protocol ID field 352 can store bytes to identify that the data for offloading of tasks to a boosting agent device or other device. In one example, the bytes in the tag field 354 can store data indicating a type of offload task the data is for. In another example, the bytes in the tag field 354 can store data indicating a communication channel to send the data packet over. In one embodiment, the data packet can be communicated over multitask virtual channels. The bytes in the tag field 354 can indicate which virtual channel to send the data packet over. For example, the data packets for offloading can be communicated over multiple data channels to different logic components or threads. In another embodiment, the data packets can be used for different offload tasks, such as graphical tasks, computational tasks, and so forth. The data in the tag field 354 can indicate a type of offload task the data in the data packet is to be used for.

The returned data length field 356 can store data indicating a byte size of a data packet that the boosting agent device can send data back to the electronic device. The flag field 358 can be reserved for expandable uses of data offloading, as discussed in greater detail below. The reserved data field 360 can store data indicating a logical unit number for logic components in the boosting agent device.

In one embodiment, when the electronic device sends an offload processing task to the boosting agent device, the length field 362 and the data field 364 can store data from the electronic device that is used by the boosting agent device in performing offloading tasks. In another embodiment, when the boosting agent device is sending data to the electronic device, the data field 362 and 364 can store data from the boosting agent device that is the results of the offload tasks performed by the boosting agent device.

In one embodiment, data field 364 can be dynamic or expandable in size to be configured to communicate an amount of data defined by the electronic device, the boosting agent device, or a system administrator, and the length field 362 can indicate the valid length. In one embodiment, data field 364 can be reserved for future use to store data for other uses, such as expandable uses of data offloading. In another embodiment, the electronic device or the boosting agent device can configure the data field 364 for the expandable uses. For example, the data fields 352-362 may be used by the electronic device and the boosting agent device to offload graphical offload processing tasks or computational tasks. The reserved bytes in the data packet format 350 can be used for offload tasks such a networking tasks or I/O extension tasks. In one embodiment, the electronic device or the boosting agent device can encrypt the data in the data fields 352-364 when sending the data and decrypt the data in the data fields 352-364 when receiving the data.

Figure 4:
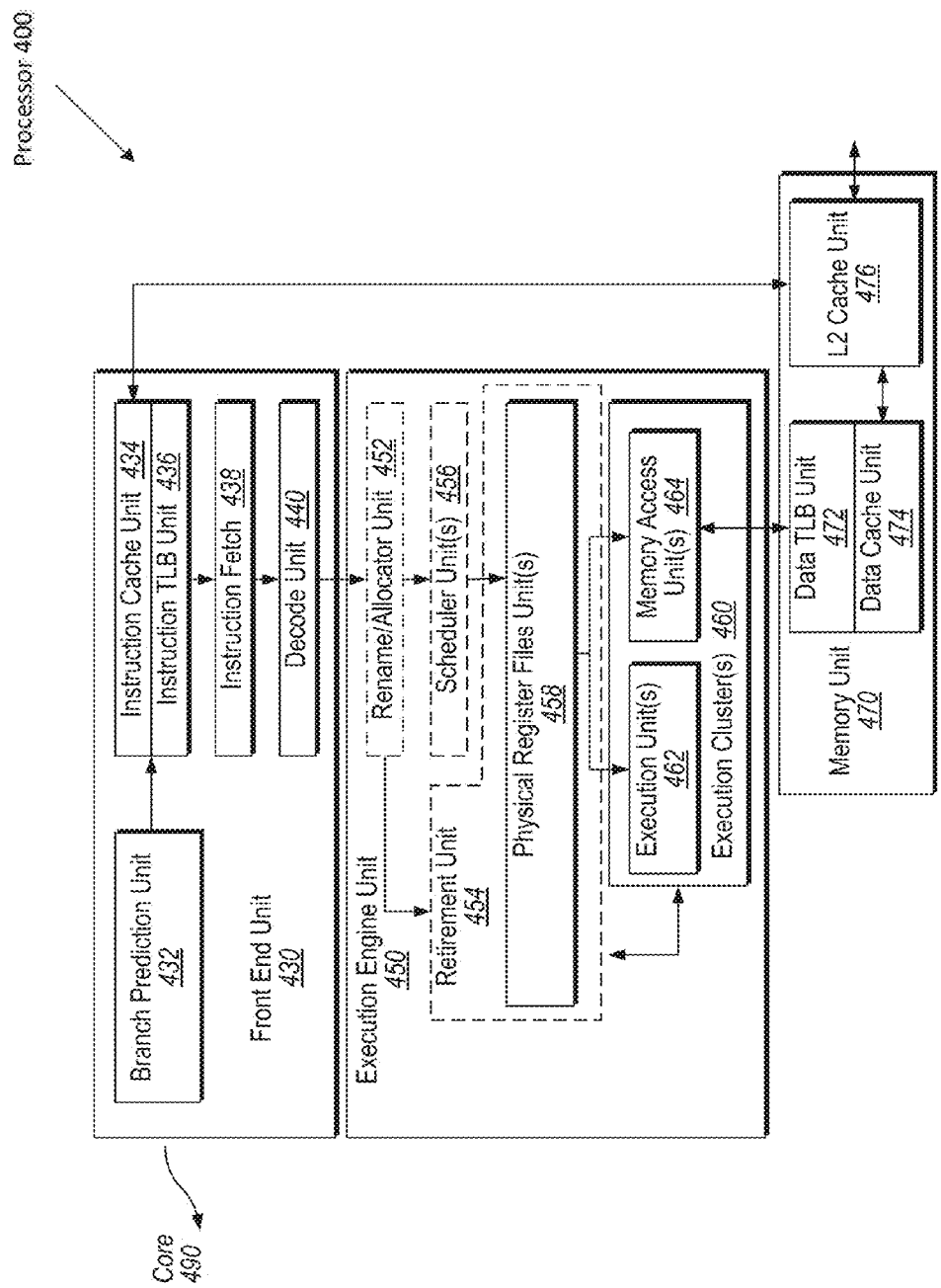
FIG. 4 is a block diagram illustrating a micro-architecture for a processor of FIG. 1, according to one embodiment.

FIG. 4 is a block diagram illustrating a micro-architecture for a processor 400 that implements the system 100 according to one embodiment. Specifically, processor 400 depicts an in-order architecture core and a register renaming logic, out-of-order issue/execution logic to be included in a processor according to at least one embodiment of the disclosure. The embodiments of the system 100 can be implemented in processor 400. In one embodiment, processor 400 is the processor 112 or 132 of FIG. 1A.

Processor 400 includes a front end unit 430 coupled to an execution engine unit 450, and both are coupled to a memory unit 470. The processor 400 may include a core 490 that is a reduced instruction set computing (RISC) core, a complex instruction set computing (CISC) core, a very long instruction word (VLIW) core, or a hybrid or alternative core type. As yet another option, processor 400 may include a special-purpose core, such as, for example, a network or communication core, compression engine, graphics core, or the like. In another embodiment, the core 490 may have five stages.

The front end unit 430 includes a branch prediction unit 432 coupled to an instruction cache unit 434, which is coupled to an instruction translation lookaside buffer (TLB) unit 436, which is coupled to an instruction fetch unit 438, which is coupled to a decode unit 440. The decode unit 440 (also known as a decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations (RS), central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which may include a data prefetcher, a data TLB unit 472, a data cache unit (DCU) 474, and a level 2 (L2) cache unit 476, to name a few examples. In some embodiments DCU 474 is also known as a first level data cache (L1 cache). The DCU 474 may handle multiple outstanding cache misses and continue to service incoming stores and loads. It also supports maintaining cache coherency. The data TLB unit 472 is a cache used to improve virtual address translation speed by mapping virtual and physical address spaces. In one exemplary embodiment, the memory access units 464 may include a load unit, a store address unit, and a store data unit, each of which is coupled to the data TLB unit 472 in the memory unit 470. The L2 cache unit 476 may be coupled to one or more other levels of cache and eventually to a main memory.

In one embodiment, the data prefetcher speculatively loads/prefetches data to the DCU 474 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 400 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
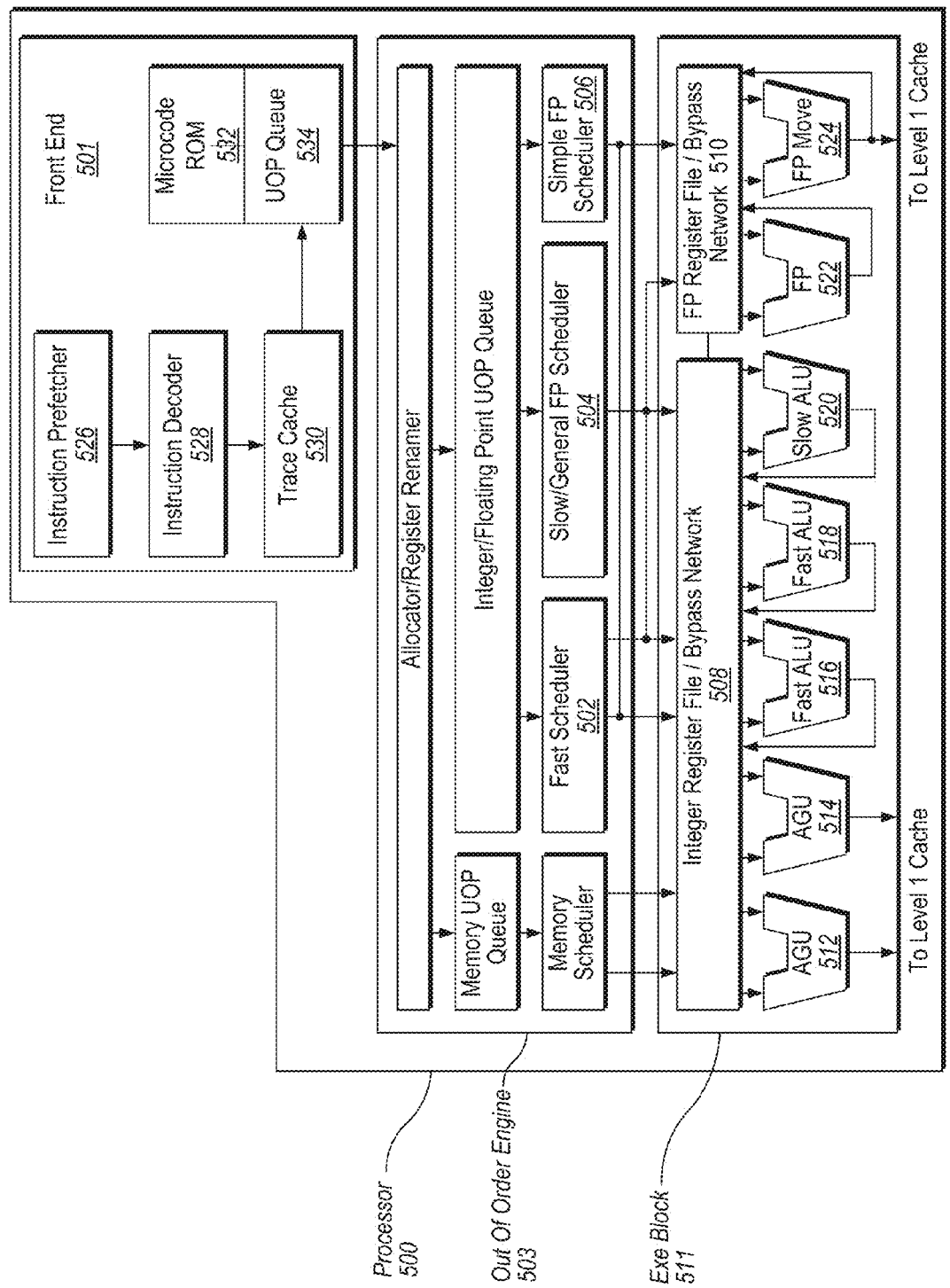
FIG. 5 illustrates a block diagram of the micro-architecture for a processor that includes logic circuits to perform access control, according to one embodiment.

FIG. 5 illustrates a block diagram of the micro-architecture for a processor 500 that includes logic circuits to perform access control according to one embodiment. In one embodiment, processor 500 is the microprocessor 112 or 132 of FIG. 1.

In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 501 is the part of the processor 500 that fetches instructions to be executed and prepares them to be used later in the processor pipeline. The embodiments of the system 100 can be implemented in processor 500.

The front end 501 may include several units. In one embodiment, the instruction prefetcher 526 fetches instructions from memory and feeds them to an instruction decoder 528 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 530 takes decoded uops and assembles them into program ordered sequences or traces in the uop queue 534 for execution. When the trace cache 530 encounters a complex instruction, the microcode ROM 532 provides the uops needed to complete the operation.

Some instructions are converted into a single micro-op, whereas others need several micro-ops to complete the full operation. In one embodiment, if more than four micro-ops are needed to complete an instruction, the decoder 528 accesses the microcode ROM 532 to do the instruction. For one embodiment, an instruction can be decoded into a small number of micro ops for processing at the instruction decoder 528. In another embodiment, an instruction can be stored within the microcode ROM 532 should a number of micro-ops be needed to accomplish the operation. The trace cache 530 refers to an entry point programmable logic array (PLA) to determine a correct micro-instruction pointer for reading the micro-code sequences to complete one or more instructions in accordance with one embodiment from the micro-code ROM 532. After the microcode ROM 532 finishes sequencing micro-ops for an instruction, the front end 501 of the machine resumes fetching micro-ops from the trace cache 530.

The out-of-order execution engine 503 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 502, slow/general floating point scheduler 504, and simple floating point scheduler 506. The uop schedulers 502, 504, 506, determine when a uop is ready to execute based on the readiness of their dependent input register operand sources and the availability of the execution resources the uops need to complete their operation. The fast scheduler 502 of one embodiment can schedule on each half of the main clock cycle while the other schedulers can only schedule once per main processor clock cycle. The schedulers arbitrate for the dispatch ports to schedule uops for execution.

Register files 508, 510, sit between the schedulers 502, 504, 506, and the execution units 512, 514, 516, 518, 520, 522, 524 in the execution block 511. There is a separate register file 508, 510, for integer and floating point operations, respectively. Each register file 508, 510, of one embodiment also includes a bypass network that can bypass or forward just completed results that have not yet been written into the register file to new dependent uops. The integer register file 508 and the floating point register file 510 are also capable of communicating data with the other. For one embodiment, the integer register file 508 is split into two separate register files, one register file for the low order 32 bits of data and a second register file for the high order 32 bits of data. The floating point register file 510 of one embodiment has 128 bit wide entries because floating point instructions typically have operands from 64 to 128 bits in width.

The execution block 511 contains the execution units 512, 514, 516, 518, 520, 522, 524, where the instructions are actually executed. This section includes the register files 508, 510, that store the integer and floating point data operand values that the micro-instructions need to execute. The processor 500 of one embodiment is comprised of a number of execution units: address generation unit (AGU)

512, AGU 514, fast ALU 516, fast ALU 518, slow ALU 520, floating point ALU 522, floating point move unit 524. For one embodiment, the floating point execution blocks 522, 524, execute floating point, MMX, SIMD, and SSE, or other operations. The floating point ALU 522 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 516, 518. The fast ALUs 516, 518, of one embodiment can execute fast operations with an effective latency of half a clock cycle. For one embodiment, most complex integer operations go to the slow ALU 520 as the slow ALU 520 includes integer execution hardware for long latency type of operations, such as a multiplier, shifts, flag logic, and branch processing. Memory load/store operations are executed by the AGUs 512, 514. For one embodiment, the integer ALUs 516, 518, 520, are described in the context of performing integer operations on 64 bit data operands. In alternative embodiments, the ALUs 516, 518, 520, can be implemented to support a variety of data bits including 16, 32, 128, 256, etc. Similarly, the floating point units 522, 524, can be implemented to support a range of operands having bits of various widths. For one embodiment, the floating point units 522, 524, can operate on 128 bits wide packed data operands in conjunction with SIMD and multimedia instructions.

In one embodiment, the uops schedulers 502, 504, 506, dispatch dependent operations before the parent load has finished executing. As uops are speculatively scheduled and executed in processor 500, the processor 500 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 500 also includes logic to implement access control according to one embodiment. In one embodiment, the execution block 511 of processor 500 may include PEL, to perform access control according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 6:
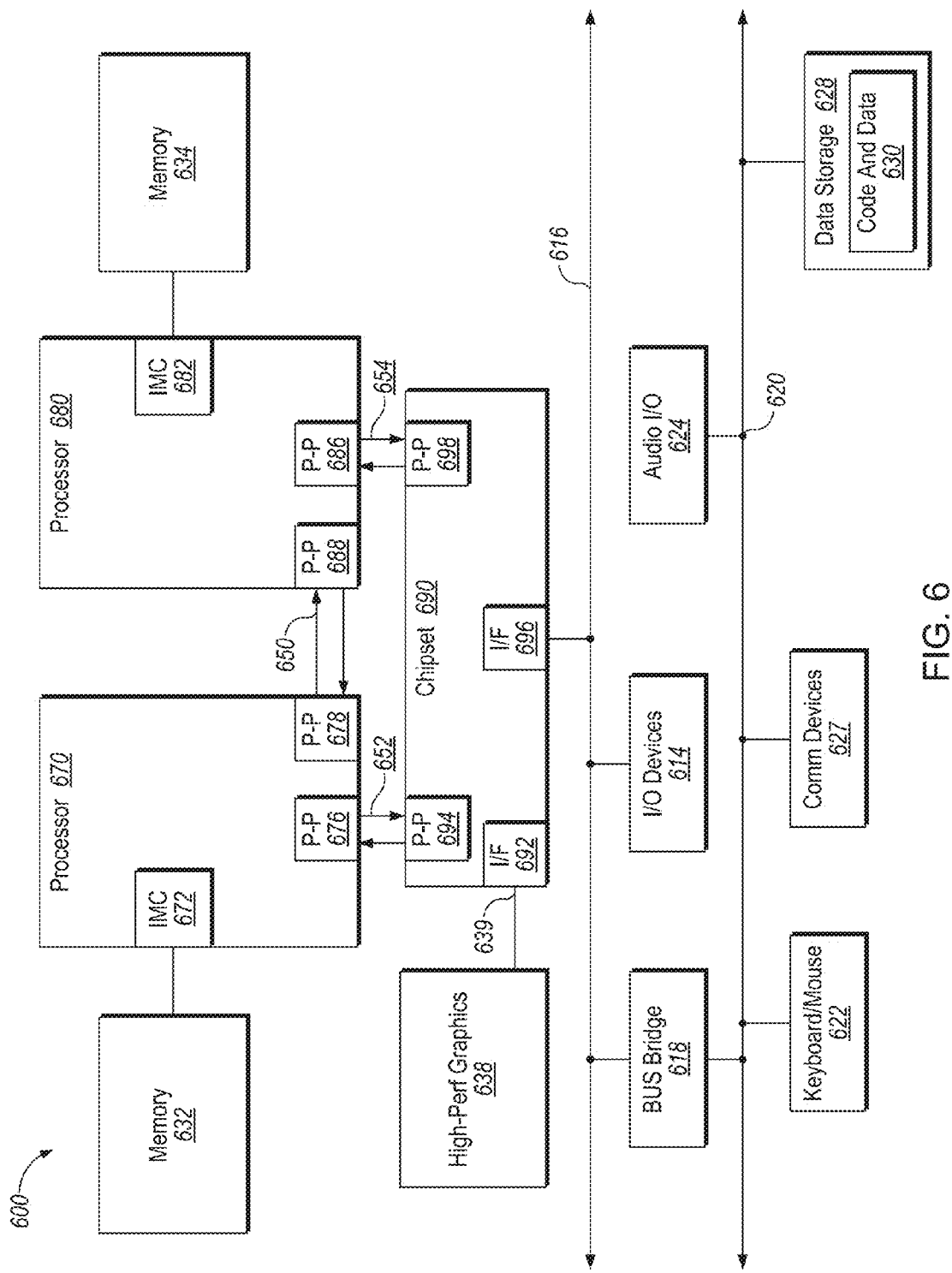
FIG. 6 is a block diagram of a computer system according to one implementation.

Embodiments may be implemented in many different system types. Referring now to FIG. 6, shown is a block diagram of a multiprocessor system 600 in accordance with an implementation. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores, although potentially many more cores may be present in the processors. The processors each may include hybrid write mode logics in accordance with an embodiment of the present. The embodiments of the system 100 can be implemented in the processor 670, processor 680, or both.

While shown with two processors 670, 680, it is to be understood that the scope of the present disclosure is not so limited. In other implementations, one or more additional processors may be present in a given processor.

Processors 670 and 680 are shown including integrated memory controller units 672 and 682, respectively. Processor 670 also includes as part of its bus controller units point-to-point (P-P) interfaces 676 and 678; similarly, second processor 680 includes P-P interfaces 686 and 688. Processors 670, 680 may exchange information via a point-to-point (P-P) interface 650 using P-P interface circuits 678, 688. As shown in FIG. 6, IMCs 672 and 682 couple the processors to respective memories, namely a memory 632 and a memory 634, which may be portions of main memory locally attached to the respective processors.

Processors 670, 680 may each exchange information with a chipset 690 via individual P-P interfaces 652, 654 using point to point interface circuits 676, 694, 686, 698. Chipset 690 may also exchange information with a high-performance graphics circuit 638 via a high-performance graphics interface 639.

A shared cache (not shown) may be included in either processor or outside of both processors, yet connected with the processors via P-P interconnect, such that either or both processors' local cache information may be stored in the shared cache if a processor is placed into a low power mode.

Chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present disclosure is not so limited.

As shown in FIG. 6, various I/O devices 614 may be coupled to first bus 616, along with a bus bridge 618 which couples first bus 616 to a second bus 620. In one embodiment, second bus 620 may be a low pin count (LPC) bus. Various devices may be coupled to second bus 620 including, for example, a keyboard and/or mouse 622, communication devices 627 and a storage unit 628 such as a disk drive or other mass storage device which may include instructions/code and data 630, in one embodiment. Further, an audio I/O 624 may be coupled to second bus 620. Note that other architectures are possible. For example, instead of the point-to-point architecture of FIG. 6, a system may implement a multi-drop bus or other such architecture.

Figure 7:
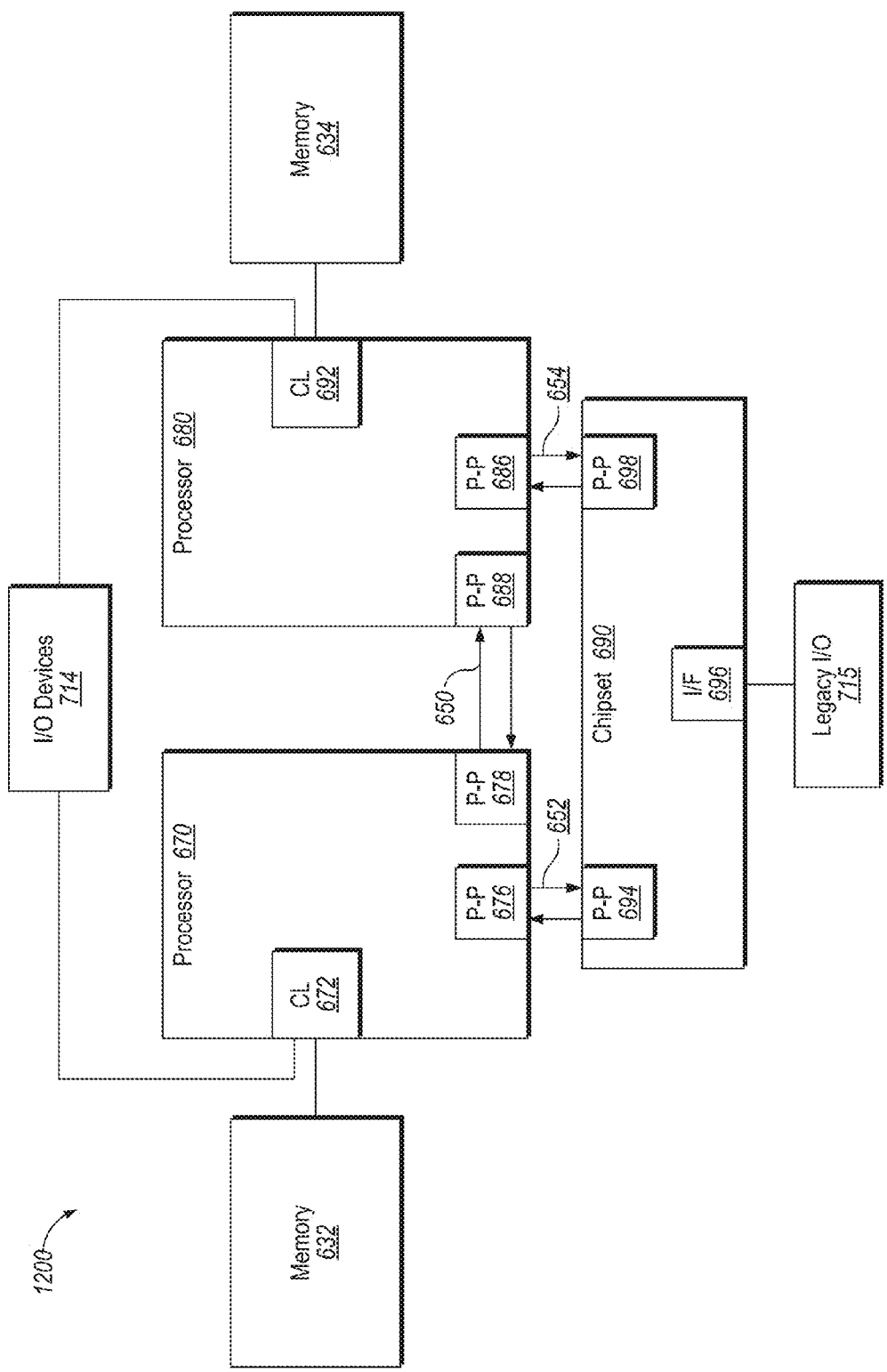
FIG. 7 is a block diagram of a computer system according to another implementation.

Referring now to FIG. 7, shown is a block diagram of a third system 700 in accordance with an embodiment of the present disclosure. Like elements in FIGS. 6 and 7 bear like reference numerals, and certain aspects of FIG. 6 have been omitted from FIG. 7 in order to avoid obscuring other aspects of FIG. 7.

FIG. 7 illustrates that the processors 670, 680 may include integrated memory and I/O control logic ("CL") 672 and 692, respectively. For at least one embodiment, the CL 672, 692 may include integrated memory controller units such as described herein. In addition. CL 672, 692 may also include I/O control logic. FIG. 7 illustrates that the memories 632, 634 are coupled to the CL 672, 692, and that I/O devices 714 are also coupled to the control logic 672, 692. Legacy I/O devices 715 are coupled to the chipset 690. The embodiments of the system 100 can be implemented in processor 670, processor 680, or both.

Figure 8:
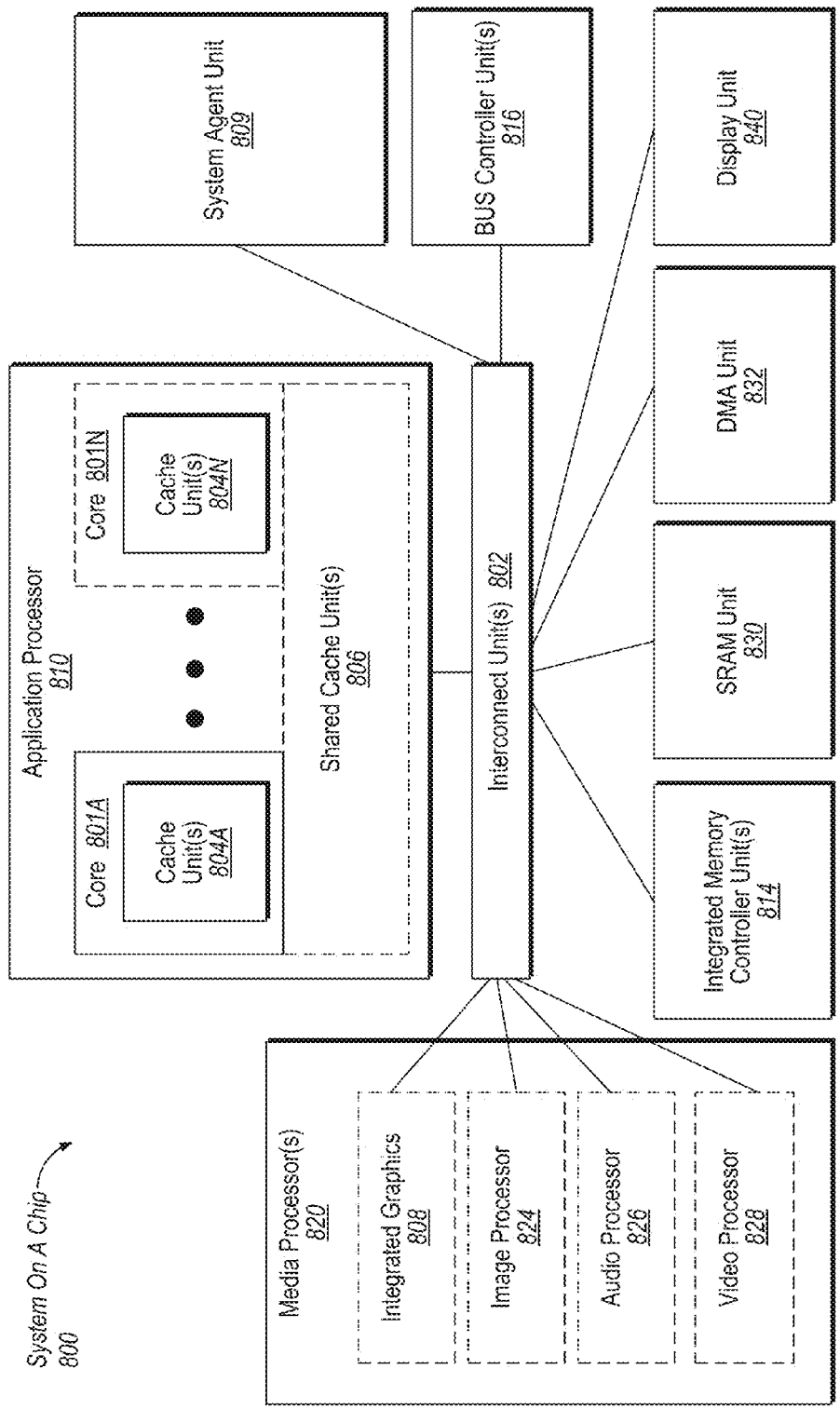
FIG. 8 is a block diagram of a system-on-a-chip according to one implementation.

FIG. 8 is an exemplary system on a chip (SoC) that may include one or more of the cores 801. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 8, shown is a block diagram of a SoC 800 in accordance with an embodiment of the present disclosure. Also, dashed lined boxes are features on more advanced SoCs. In FIG. 8, an interconnect unit(s) 802 is coupled to: an application processor 810 which includes a set of one or more cores 801A-N and shared cache unit(s) 806; a system agent unit 809; a bus controller unit(s) 816; an integrated memory controller unit(s) 814; a set or one or more media processors 820 which may include integrated graphics logic 808, an image processor 824 for providing still and/or video camera functionality, an audio processor 826 for providing hardware audio acceleration, and a video processor 828 for providing video encode/decode acceleration; a static random access memory (SRAM) unit 830; a direct memory access (DMA) unit 832; and a display unit 840 for coupling to one or more external displays. The embodiments of the pages additions and content copying can be implemented in SoC 800.

Figure 9:
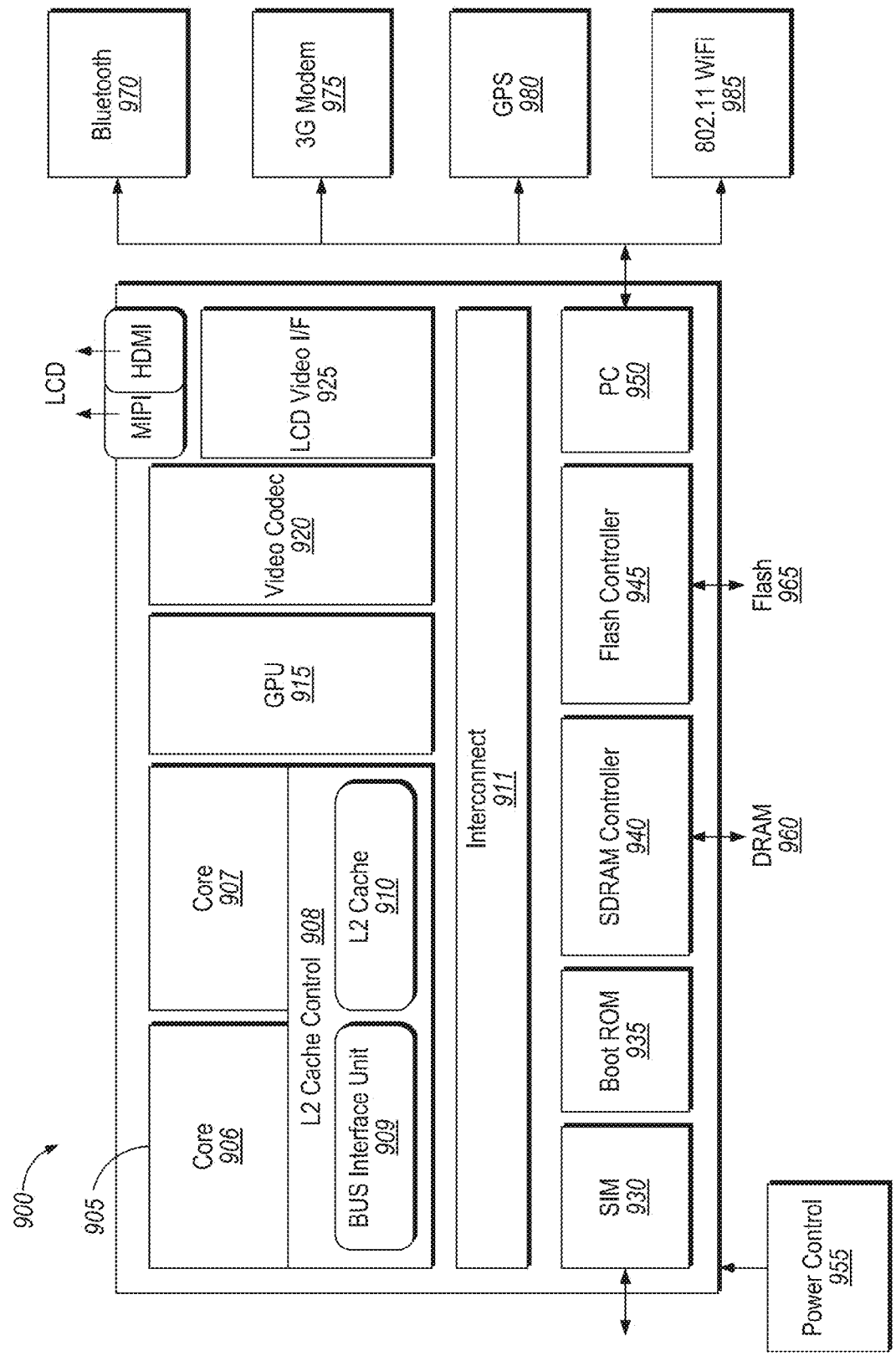
FIG. 9 illustrates another implementation of a block diagram for a computing system.

Turning next to FIG. 9, an embodiment of a system on-chip (SoC) design in accordance with embodiments of the disclosure is depicted. As an illustrative example, SoC 900 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the system 100 can be implemented in SoC 900.

Here, SoC 900 includes 2 cores—906 and 907. Similar to the discussion above, cores 906 and 907 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 906 and 907 are coupled to cache control 908 that is associated with bus interface unit 909 and L2 cache 910 to communicate with other parts of system 900. Interconnect 911 includes an on-chip interconnect, such as an IOSF, AMBA, or other interconnects discussed above, which can implement one or more aspects of the described disclosure.

Interconnect 911 provides communication channels to the other components, such as a Subscriber Identity Module (SIM) 930 to interface with a SIM card, a boot ROM 935 to hold boot code for execution by cores 906 and 907 to initialize and boot SoC 900, a SDRAM controller 940 to interface with external memory (e.g. DRAM 960), a flash controller 945 to interface with non-volatile memory (e.g. Flash 965), a peripheral control 950 (e.g. Serial Peripheral Interface) to interface with peripherals, video codecs 920 and Video interface 925 to display and receive input (e.g. touch enabled input), GPU 915 to perform graphics related computations, etc. Any of these interfaces may incorporate aspects of the embodiments described herein.

In addition, the system illustrates peripherals for communication, such as a Bluetooth module 970, 3G modem 975, GPS 980, and Wi-Fi 985. Note as stated above, a UE includes a radio for communication. As a result, these peripheral communication modules may not all be included. However, in a UE some form of a radio for external communication should be included.

Figure 10:
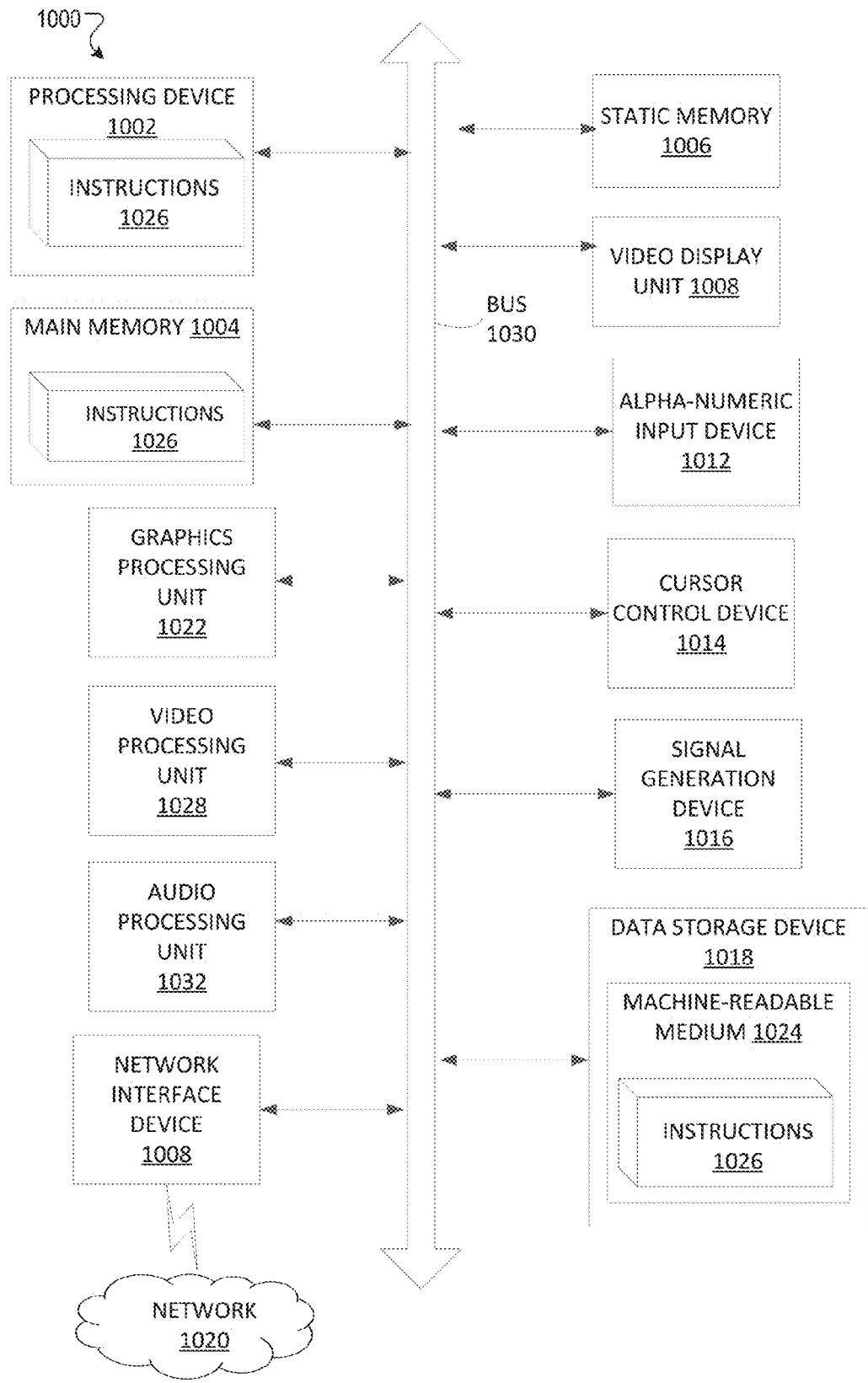
FIG. 10 illustrates another implementation of a block diagram for a computing system.

FIG. 10 illustrates a diagrammatic representation of a machine in the example form of a computing system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the system 100 can be implemented in computing system 1000.

The computing system 1000 includes a processing device 1002, main memory 1004 (e.g., read-only memory (ROM), flash memory, dynamic random access memory (DRAM) (such as synchronous DRAM (SDRAM) or DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In one embodiment, processing device 1002 may include one or processor cores. The processing device 1002 is configured to execute the instructions 1026 (e.g., processing logic) for performing the operations discussed herein. In one embodiment, processing device 1002 can include the processor 112 or 132 of FIG. 1. Alternatively, the computing system 1000 can include other components as described herein. It should be understood that the core may support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

The computing system 1000 may further include a network interface device 1008 communicably coupled to a network 1020. The computing system 1000 also may include a video display unit 1008 (e.g., a liquid crystal display (LCD) or a cathode ray tube (CRT)), an alphanumeric input device 1012 (e.g., a keyboard), a cursor control device 1014 (e.g., a mouse), a signal generation device 1016 (e.g., a speaker), or other peripheral devices. Furthermore, computing system 1000 may include a graphics processing unit 1022, a video processing unit 1028 and an audio processing unit 1032. In another embodiment, the computing system 1000 may include a chipset (not illustrated), which refers to a group of integrated circuits, or chips, that are designed to work with the processing device 1002 and controls communications between the processing device 1002 and external devices. For example, the chipset may be a set of chips on a motherboard that links the processing device 1002 to very high-speed devices, such as main memory 1004 and graphic controllers, as well as linking the processing device 1002 to lower-speed peripheral buses of peripherals, such as USB, PCI or ISA buses.

The data storage device 1018 may include a computer-readable storage medium 1024 on which is stored instructions 1026 (e.g., software) embodying any one or more of the methodologies of functions described herein. The instructions 1026 (e.g., software) may also reside, completely or at least partially, within the main memory 1004 as instructions 1026 and/or within the processing device 1002 as processing logic during execution thereof by the computing system 1000; the main memory 1004 and the processing device 1002 also constituting computer-readable storage media.

The computer-readable storage medium 1024 may also be used to store instructions 1026 utilizing the processing device 1002, such as the processor 112 or 132 described with respect to FIG. 1, and/or a software library containing methods that call the above applications. While the computer-readable storage medium 1024 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a boosting agent device including: 1) a processor to execute an application to process processing tasks on behalf of a processor of an electronic device when coupled to the boosting agent device; 2) a memory to store data; and 3) an interface device coupled to the processor of the boosting agent, where the interface device is to communicate with the electronic device according to a communication protocol, where the application is to: a) determine a current processing capability of the boosting agent; b) send a request message to the electronic device via the interface device, where the request message comprises a standard link protocol format with a first reserved field that stores the current processing capability of the boosting agent; c) receive a response message from the electronic device via the interface device, where the response message comprises the standard link protocol format with a second reserved field including a offload processing task to be processed by the processor of the boosting agent on behalf of the processor of the electronic device; d) process the offload processing task to obtain result data; and e) send a message to the electronic device via the interface device, where the message comprises the standard link protocol format with a third reserved field including the result data In Example 2, the boosting agent device of Example 1, where the processor is further to: 1) format the result data to be in the standard link protocol format; and 2) send the result data to the electronic device.

In Example 3, the boosting agent device of any one of Examples 1-2, where the interface device comprises a universal serial bus (USB) type C connector and operates according to a USB type C standard link communication protocol including alternate modes, where the standard link protocol format comprises a token packet with a header defining a type of data formatted using the standard link protocol, an data packet, and a status packet to indicate a status of a transaction between the boosting agent and the electronic device.

In Example 4, the boosting agent device of any one of Examples 1-3 includes a power source operable to provide power to the electronic device via the interface device, and where the interface device comprises a wireless communication module or a wired communication module.

In Example 5, the boosting agent device of any one of Examples 1-4, where 1) the standard link protocol defines a protocol to couple the boosting agent device to the electronic device; and 2) the message is a data packet including data of the offload processing task, where the offload processing task is a computational task, a graphical processing task, a network processing task, an audio processing task, or an input/output (I/O) extension task.

In Example 6, the boosting agent device of any one of Examples 1-5 where standard link protocol comprises: 1) a top sub-layer protocol indicating a first protocol for controlling functions of the boosting agent device; 2) a middle sub-layer protocol indicating a second protocol for formatting offload processing task information; and 3) a bottom sub-layer protocol indicating a third protocol for communicating offload processing task information over a communication channel between the electronic device and the boosting agent.

In Example 7, the boosting agent device of any one of Examples 1-6 where the bottom sub-layer protocol further indicates protocols for establishing a transmit path and a receive path between the electronic device and the boosting agent device.

In Example 8, the boosting agent device of any one of Examples 1-7, where the processor is further to format the offload processing task information using the middle sub-layer protocol, and where the format comprises an offload protocol identification (ID) field, a tag field, a returned data length field, a flag field, a reserved field, a length field, and a data field.

In Example 9, the boosting agent device of any one of Examples 1-8, where: 1) the offload protocol ID field is a field to store bytes to indicate that the offload processing task information is data for an offloading of tasks to the boosting agent device, 2) the tag field is a field to store bytes indicating a virtual channel identifier of the offload processing task, 3) the returned data length field is a field to store bytes indicating a byte size of a result data that the boosting agent device is to send data back to the electronic device, 4) the flag field is a reserved field to store reserved bytes for expandable offload functionalities, and 5) the reserved field is a field to store bytes indicating logic unit number of multiple logic functions in the boosting agent device.

In Example 10, the boosting agent device of any one of Examples 1-9, where the result data is communicated over multitask virtual channels and the bytes in the tag field indicate a communication channel to send the result data over.

In Example 11, the boosting agent device of any one of Examples 1-10, where the data field is a field to store bytes of the processing task types and input data and the length field is a field to indicate a valid length of the data field.

Various embodiments may have different combinations of the structural features described above. For instance, all optional features of the computing system described above may also be implemented with respect to the method or process described herein and specifics in the examples may be used anywhere in one or more embodiments.

Example 12 is a system on a chip (SoC) including: 1) a memory to store data; and 2) a processor coupled to the memory, the processor to: 1) receive a data packet from an electronic device via an interface device, the data packet including data for an offload processing task, where the data packet is in a standard link protocol format, the standard link protocol format including at least one of an offload protocol identification (ID) field, a tag field, a returned data length field, a flag field, a reserved field, a length field, or a data field; 2) process the offload processing task to obtain result data; and 3) send the result data to the electronic device.

In Example 13, the SoC of Example 12, where the data field is expandable in size to communicate an amount of data defined by the electronic device or the processor.

In Example 14, the SoC of Examples 12-13, where the reserved field is reserved for storing data for expandable offloading tasks.

In Example 15, the SoC of Examples 12-14, where the reserved field is a field to store bytes for a networking task or an input/output (I/O) extension task.

Various embodiments may have different combinations of the structural features described above. For instance, all optional features of the computing system described above may also be implemented with respect to the method or process described herein and specifics in the examples may be used anywhere in one or more embodiments.

Example 16 is a method including: 1) sending, from a boosting agent device, a message to an electronic device requesting an offload processing task, where the message comprises capability information stores a current processing capability of the boosting agent; 2) receiving, at the boosting agent device, a response data packet from the electronic device, the response data packet including data for the offload processing task, where the response data packet is in a standard link protocol format; 3) processing, by a processor of the boosting agent device, the offload processing task to obtain result data; and 4) sending, by an interface device of the boosting agent device, the result data to the electronic device.

In Example 17, the method of Example 16, further including providing power from a power source of the boosting agent to the electronic device via the interface device.

In Example 18, the method of Examples 16-17, further including providing the power and performing the offload processing task simultaneously.

In Example 19, the method of Examples 16-18, where the interface device is a universal serial bus (USB) type C interface.

In Example 20, the method of Examples 16-19, further including receiving the electronic device at a docking port of the boosting agent device.

Various embodiments may have different combinations of the structural features described above. For instance, all optional features of the computing system described above may also be implemented with respect to the method or process described herein and specifics in the examples may be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to access control in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a microcontroller, associated with a non-transitory medium to store code adapted to be executed by the microcontroller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A device comprising:
   a processing unit comprising:
     a first processor;
     a first memory coupled to the first processor;
     an interface unit coupled to the processing unit, wherein the interface unit is to communicate with an electronic device, wherein the electronic device comprises a second processor coupled to a second memory; and
     the processing unit configured to:
       determine a processing capability of the processing unit, wherein the processing capability of the processing unit comprises at least one of a processing capacity of the first processor or a memory capacity of the first memory;
       send a request message to the electronic device via the interface unit, wherein the request message comprises a standard link protocol format with a first reserved field that stores the processing capability of the processing unit;
       receive a response message from the electronic device via the interface unit, wherein the response message comprises the standard link protocol format with a second reserved field comprising a first processing task to be processed by the processing unit;
       execute the first processing task to obtain result data; and
       send a result message to the electronic device via the interface unit, wherein the result message comprises the standard link protocol format with a third reserved field comprising the result data.

2. The device of claim 1, wherein the processor is further to
   format the result data to be in the standard link protocol format before the result message is sent to the electronic device.

3. The device of claim 1, wherein the interface unit comprises a universal serial bus (USB) type C connector and operates according to a USB type C standard link communication protocol including alternate modes, wherein the standard link protocol format comprises a token packet with a header defining a type of data formatted using the standard link protocol, a data packet, and a status packet to indicate a status of a transaction between the processing unit and the electronic device.

4. The device of claim 1, further comprising a power source operable to provide power to the electronic device via the interface unit, and wherein the interface unit comprises a wireless communication module or a wired communication module.

5. The device of claim 1, wherein:
   the standard link protocol format defines a protocol to couple the processing unit to the electronic device; and
   wherein the first processing task is a computational task, a graphical processing task, a network processing task, an audio processing task, or an input/output (I/O) extension task.

6. The device of claim 1, wherein the standard link protocol format comprises:
   a top sub-layer protocol indicating a first protocol for controlling functions of the processing unit;
   a middle sub-layer protocol indicating a second protocol for formatting a processing task information; and
   a bottom sub-layer protocol indicating a third protocol for communicating the processing task information over a communication channel between the electronic device and the processing unit.

7. The device of claim 6, wherein the bottom sub-layer protocol further indicates protocols for establishing a transmit path and a receive path between the electronic device and the processing unit.

8. The device of claim 6, wherein the first processor is further to format the processing task information using the middle sub-layer protocol, and wherein the processing task information comprises an offload protocol identification (ID) field, a tag field, a returned data length field, a flag field, a reserved field, a length field, and a data field.

9. The device of claim 8, wherein:
   the offload protocol ID field is to store bytes to indicate that the processing task information comprises data for an offloading of tasks to the processing unit, the tag field is to store bytes indicating a virtual channel identifier of the first processing task, the returned data length field is to store bytes indicating a byte size of the result data, the flag field is to store reserved bytes for expandable offload functionalities, and the reserved field is to store bytes indicating logic unit number of multiple logic functions in the processing unit.

10. The device of claim 9, wherein the result data is communicated over a plurality of multitask virtual channels and the bytes in the tag field indicate a communication channel to send the result data over.

11. The device of claim 9, wherein the data field is to store bytes indicating a type of the first processing task, input data, and the length field is to indicate a valid length of the data field.

12. A system on a chip (SoC) comprising:
a first memory to store data; and
a first processor coupled to the first memory, the first processor to:
receive from an electronic device via an interface unit a processing requirement for execution of an offload processing task and a data packet, the electronic device comprising a second memory and a second processor, the data packet comprising data for the offload processing task, wherein the data packet is in a standard link protocol format, the standard link protocol format comprising at least one of an offload protocol identification (ID) field, a tag field, a returned data length field, a flag field, a reserved field, a length field, or a data field;
determine a processing capability comprising at least one of a processing capacity of the first processor or a memory capacity of the first memory;
responsive to determining that the processing requirement does not exceed the processing capability process the offload processing task using the first processor and the first memory to obtain result data; and
provide the result data to the electronic device via the interface unit.

13. The SoC of claim 12, wherein the data field is expandable in size to communicate an amount of data defined by the electronic device or the first processor.

14. The SoC of claim 12, wherein the reserved field is reserved for storing data for expandable offloading tasks.

15. The SoC of claim 12, wherein the reserved field is to store bytes for a networking task or an input/output (I/O) extension task.

16. A method, comprising:
establishing, via an interface unit, a connection between a boosting agent device and an electronic device, the boosting agent device comprising a first processor and a first memory, the electronic device comprising a second processor and a second memory;
sending, from the boosting agent device, a message to the electronic device requesting an offload processing task;
receiving, at the boosting agent device, a response from the electronic device, the response comprising a processing requirement for execution of the offload processing task and a data packet comprising data for the offload processing task, wherein the data packet is in a standard link protocol format;
determining a processing capability of the boosting agent device, wherein the processing capability comprises at least one of a processing capacity of the first processor or a memory capacity of the first memory;
responsive to determining that the processing requirement does not exceed the processing capability, processing, using the first processor of the boosting agent device, the offload processing task to obtain result data; and
sending, by an interface unit of the boosting agent device, the result data to the electronic device.

17. The method of claim 16, further comprising providing power from a power source of the boosting agent to the electronic device via the interface unit.

18. The method of claim 17, further comprising providing the power and processing the offload processing task simultaneously.

19. The method of claim 16, wherein the interface unit is a universal serial bus (USB) type C interface.

20. The method of claim 16, further comprising receiving the electronic device at a docking port of the boosting agent device.

* * * * *